July 23, 1968 J. D. HICKERSON 3,394,033
DEFERRED ACTION CELL WITH PERFORATED ENCLOSED WALL
Filed Aug. 3, 1965
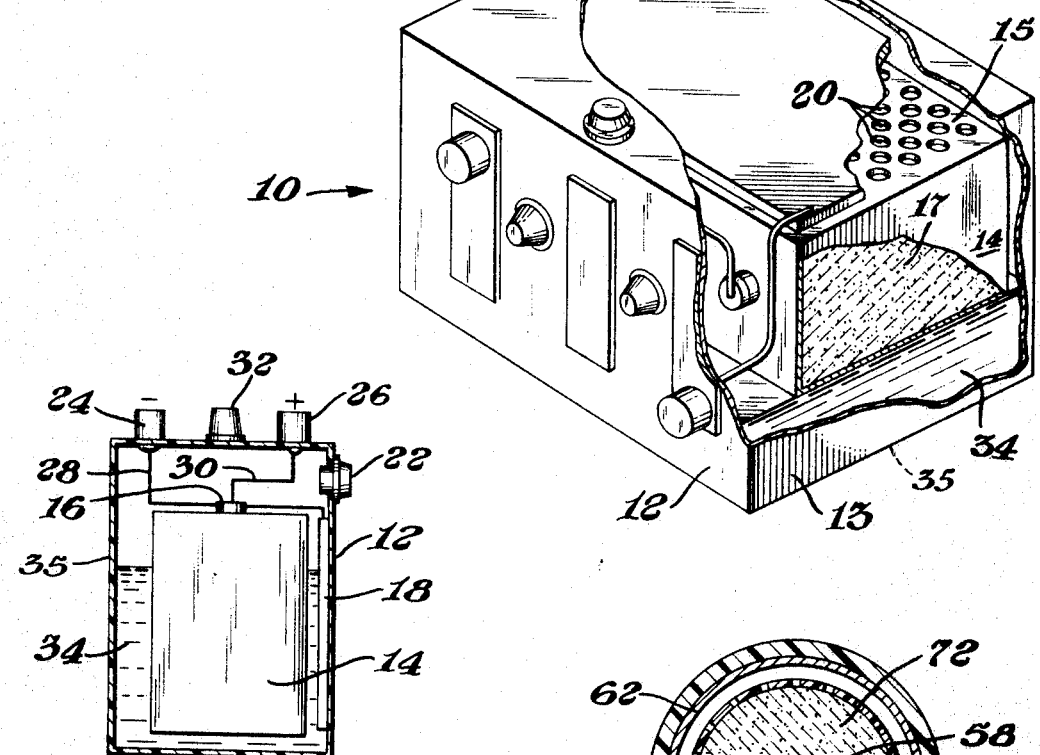
Fig.1
Fig.2
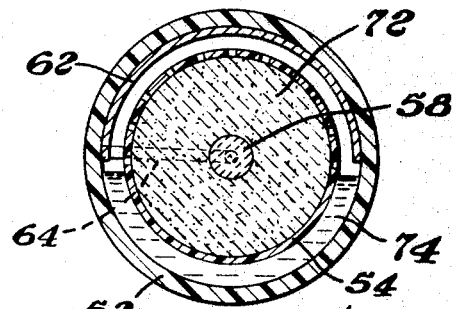
Fig.4
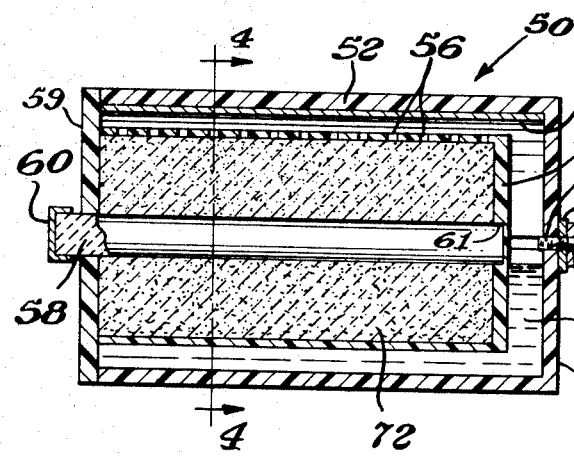
Fig.3
INVENTOR.
John D. Hickerson
BY Earl D. Ayers
AGENT

United States Patent Office 3,394,033
Patented July 23, 1968

3,394,033
DEFERRED ACTION CELL WITH PERFORATED ENCLOSED WALL
John D. Hickerson, Midland, Mich., assignor to The Dow Chemical Company, Midland, Mich., a corporation of Delaware
Filed Aug. 3, 1965, Ser. No. 476,860
8 Claims. (Cl. 136—92)

ABSTRACT OF THE DISCLOSURE

This invention relates to a deferred action type of wet cell construction that is simple to activate and deactivate. The electrolyte is carried in a reservoir which is an integral part of the battery construction. Activation is achieved simply by placing the battery in the active position. Gravity rapidly forces the electrolyte to flow from the reservoir into the anode-cathode chamber. The battery can be easily deactivated by gravity by placing it back in its storage or deactivated position.

---

This invention relates to primary cells, and particularly to so-called deferred action primary cells.

Deferred action or reserve batteries are employed with active anode and cathode materials which tend to decompose rapidly in the presence of electrolyte and/or when an exceedingly prolonged open circuit storage time is needed. One of the common constructions for such batteries calls for the electrolyte to be stored in a reservoir which is an appendix to the main body of the battery. In this way the optimum eletrolyte for the electrochemical couple can be utilized. The electrolyte is forced from the reservoir into the anode-cathode chamber to activate the battery for use. There is no simple provision for de-activating, thus energy not removed from battery when it once is activated is wasted. This type of construction is suited only for "one shot" applications.

Another type of construction calls for dropping the battery into a vessel of electrolyte or the ocean. This has the advantage of not having to transport the electrolyte weight. It has the disadvantages of not being assured of the optimum electrolyte and the need for an open electrolyte path from cell to cell in the battery. This common path results in intercell shorting causing loss of voltage and energy. Again there is no provision for simple deactivation and reactivation so these are also "one shot" batteries.

Accordingly, a principal object of this invention is to provide an improved deferred action type primary cell.

Another object of this invention is to provide an improved delayed action primary cell which may be readily activated and deactivated.

A further object of this invention is to provide an improved delayed action primary cell which is economical to manufacture.

Yet another object of this invention is to provide an improved delayed action primary cell which is easy to use.

In accordance with this invention there is provided a deferred action type of wet cell construction that is simple to activate and deactivate. The electrolyte is carried in a reservoir which is an integral part of the battery construction. Activation is achieved simply by placing the battery in the active position. Gravity rapidly forces the electrolyte to flow from the reservoir into the anode-cathode chamber. The electrolyte flow forces the gas through an upper vent. This assures rapid and positive filling and eliminates the chance of gas blocking. The battery can be easily deactivated by gravity by just placing it back in its storage or deactivated position. This battery can be activated and deactivated at will so this is a deferred action battery that can be utilized intermittently.

The electrolyte solution can be placed in the reservoir at time of manufacture or any time thereafter. Also just the electrolyte salts can be placed in the reservoir and the optimum electrolyte formed any time by just adding water.

The invention as well as additional objects and advantages thereof, will best be understood when the following detailed description is read in connection with the accompanying drawing, in which:

FIG. 1 is an isometric view, partly broken away and in section, of a delayed action cell in accordance with this invention;

FIG. 2 is an elevational view, partly in section, showing the cell of FIG. 1 in its so-called "activated" position;

FIG. 3 is a side elevational view, in section, of another delayed action cell in accordance with this invention; and FIG. 4 is a sectional view taken along the lines 4—4 of FIG. 3.

Referring to FIGS. 1 and 2, there is shown a delayed action cell, indicated generally by the numeral 10, which includes an essentially liquid tight casing 12, a rectangular box-like inner container 14 supported from the end walls (13, for example) of the casing 12. The container 14 has a side wall 15 which contains an array of spaced apart bores 20.

The container 14 has a cathode mix 17 in its interior part.

The container is so-disposed that the side wall 15 is adjacent to (usually parallel to) and spaced from a plate-like anode 18 of magnesium alloy, for example, which, as shown, is disposed against a side wall of the casing 12.

The anode 18 is coupled to a terminal 24 extending through the top of the cell by means of a lead 28. The cathode 16, which is rod-like in form, usually carbon, and extends into the cathode mix 17, is coupled to a terminal 26 which extends through the top of the casing 12 by means of a lead 30.

One or more vents 32 also extend through the top of the casing 12.

Electrolyte 34 may be introduced into the casing 12 through the removable plug 22 in the wall of the casing 12, for example.

The container 14 is positioned a substantial distance away from the side wall of the casing 12 which is adjacent to the anode 18.

When the cell 10 is positioned as shown in FIG. 1, the electrolyte 34 lies substantially entirely between the casing 12 and the side wall 35.

When the cell 10 is positioned upright, as shown in FIG. 2, the electrolyte 34 flows around the container 14, between the container 14 and the anode 18, and through the bores 20 in the side 15 of the container to permeate the cathode mix 17.

Thus, when the cell is in the position shown in FIG. 2, it is activated, and current may be drawn from the cell. Once the cell is turned on its side as in FIG. 1, it becomes deactivated because there is no electrolytic path between the cathode mix and the anode 18.

Though shown abutting against the wall of the casing the anode 18 may be spaced from the wall to permit use of both sides of the anode to provide current output from the cell. Under such circumstances the anode 18 may be provided with perforations like the perforations 20 in the wall 15 of the container, to permit a shorter electrolytic path between the cathode mix and the back face of the anode.

An alternative embodiment of primary cell in accordance with this invention is shown in FIGS. 3 and 4. The outer casing 52 of the cell 50 is of hollow cylindrical configuration, and made of a liquid impervious material which is electrically insulating, such as polyethylene, for example.

An anode 62 which is semi-circular when viewed in transverse cross-section is disposed within the casing 52, being curved to fit snugly against the curved inner wall of the casing.

A hollow tubular housing 54 having bores 56 in and around one half of its side wall (that part of its side wall which faces the anode 62) is secured within the casing 52 with its side walls parallel with the side walls of the casing and spaced therefrom.

A cathode electrode 58, usually a carbon rod, extends through the end 59 of the casing 52 and terminates in a recess 61 in the opposite end of the housing. The space inside the housing 54 not occupied by the cathode electrode 56 is substantially filled with cathode mix 72.

The end of the cathode rod 58 which protrudes from the casing 52 is covered by a metal cap 60.

The space between the housing 54 and casing 52 is about half filled with electrolyte 74.

The anode terminal of the cell is made by feeding a strip 64 of anode metal through a small centrally disposed bore 66 in the end 67 of the casing 52. A gasket strip 68 fits over the part of the strip 68 which extends outwardly from the end 67 of the casing. An electrode contact 70 of cylindrical outer configuration is screwed tightly onto the strip 64, holding the sealing gasket 68 firmly between the end 67 and contact 70.

The space between the housing 54 and casing 52 is about half filled with electrolyte 74.

To operate the cell, the casing is rotated around its axis to bring the electrolyte in contact with the cathode 58, cathode mix 72, and the anode 62.

The cell 50, like the cell 10, may be used as a rheostat controlled cell, in effect, by allowing only a part of the anode to be contacted by electrolyte.

The cell 50 may be vented, for example, through the porous carbon rod 58.

The magnesium metal anode 18 or 62 may be formed of any suitable magnesium alloy, for example, the quick acting alloy containing aluminum and minor amounts of indium. Suitable alloys are described in U.S. Patents 2,934,583 and 3,038,019.

The cathode mix 17 or 72 may be made up of any suitable composition normally employed for primary dry cells having magnesium anodes. Such mix cake is also known as a depolarizing mass. The mix cake is made up from a mixture of manganese dioxide and carbon black which is readily compressed or molded into cake form after being moistened with the electrolyte. A suitable mixture contains from 75 to 95 percent by weight manganese dioxide and the balance carbon black. A desirable mixture consists of 90 percent by weight $MnO_2$ (gold coast ore) and 10 percent acetylene black.

The electrolyte 34 or 74 is prepared by dissolving an alkali metal bromide, alkaline earth metal bromide or ammonium bromide in water in a concentration between about 30 grams per liter and that producing a nearly saturated solution at ordinary temperatures. The actual concentration used does not appear to be critical, although for best results certain concentrations are to be preferred depending upon the particular bromide or combination of bromides used. For example, preferred concentrations of the alkali metal bromides are from about 150 to 500 grams of the salt per liter of solution. Of the alkali metal bromides, lithium bromide produces the most desirable results, particularly in concentrations of about 300 grams per liter. Similar concentrations may be used with the alkaline earth metal bromides, which include the bromides of magnesium, calcium, barium and strontium. Of these, magnesium bromide is to be preferred. Its most effective concentration is about 300 grams per liter of solution.

While a single bromide may be used as the electrolyte, better results are had with combinations of the aforesaid bromides, particularly combinations of an alkali metal bromide with an alkaline earth metal bromide, such better results being manifested in greater shelf life and higher capacity.

It is desirable to include in the electrolyte an alkali metal, alkaline earth metal or ammonium, salt of chromic acid in corrosion inhibiting amounts, such as from 0.01 gram per liter of solution to concentrations producing saturation in the presence of the bromide therein. A preferred concentration of the chromic acid salt is 0.05 to 2 grams per liter of solution. A number of specific suitable electrolyte compositions are set forth in U.S. Patents 2,547,907 and 2,547,908.

What is claimed is:

1. A primary cell comprising a substantially liquid tight walled hollow casing including at least opposed terminal end walls and side walls, a pair of said terminal electrodes extending outwardly from said walls, an enclosed walled housing member having a perforated side wall, a cathode electrode and cathode mix, said cathode electrode and said cathode mix being disposed within said housing member, said housing member being disposed in and spaced from the walls of said casing on at least two sides including the side having perforations therein, an anode, said anode being adjacent to but spaced from said perforations in said housing member, means connecting said anode and cathode electrode to said terminal electrodes, and liquid electrolyte, said liquid electrolyte being sufficiently large in quantity to fill the space between said cathode mix and said anode when said cell is oriented in one position and sufficiently small in quantity to be remote from the space between said cathode mix and anode when said cell is oriented in another position.

2. A primary cell in accordance with claim 1, wherein said casing and said housing member are of hollow cylindrical configuration.

3. A primary cell in accordance with claim 1, wherein said anode is an elongated element which is of arcuate transverse cross-sectional configuration.

4. A primary cell in accordance with claim 2, wherein said cathode is rod-like in form and extends through an end of said housing member and casing, the exposed end of the rod serving as a terminal electrode.

5. A primary cell in accordance with claim 4, wherein said rod-like cathode is aligned with the longitudinal axis of said housing member and casing and said other terminal is disposed at the opposite end of said casing in alignment with said first terminal electrode.

6. A primary cell in accordance with claim 1, wherein said anode is a magnesium alloy.

7. A primary cell in accordance with claim 1, wherein said anode is disposed against a wall of said casing.

8. A primary cell in accordance with cliam 1, wherein said perforations are in an array which is substantially coextensive in area with the anode area.

References Cited
UNITED STATES PATENTS

| | | | |
|---|---|---|---|
| 2,616,940 | 11/1952 | Reid | 136—100 |
| 2,655,551 | 10/1953 | Ellis | 136—100 |
| 3,156,586 | 11/1964 | Solomon et al. | 136—100 |

WINSTON A. DOUGLAS, *Primary Examiner.*

C. F. LE FEVOUR, *Assistant Examiner.*